United States Patent [19]

Suzuki

[11] Patent Number: 5,732,985
[45] Date of Patent: Mar. 31, 1998

[54] COUPLING HARDWARE

[75] Inventor: Masashi Suzuki, Tokyo, Japan

[73] Assignee: Okawa Screw Manufacturing Co., Ltd., Tokyo, Japan

[21] Appl. No.: 550,913

[22] Filed: Oct. 31, 1995

[51] Int. Cl.$^6$ ............................................. F16L 25/00
[52] U.S. Cl. ................................. 285/332; 285/382
[58] Field of Search ........................ 285/382, 382.2, 285/921, 332

[56] References Cited

U.S. PATENT DOCUMENTS

| | | | |
|---|---|---|---|
| 3,262,721 | 7/1966 | Knight | 285/921 X |
| 3,326,006 | 6/1967 | Mount | 285/382 X |
| 4,030,850 | 6/1977 | Hyde | 285/921 X |
| 4,049,297 | 9/1977 | Reneau | 285/921 X |
| 4,310,184 | 1/1982 | Campbell | 285/382 X |
| 4,685,706 | 8/1987 | Kowal et al. | 285/382 X |
| 4,799,715 | 1/1989 | Goubeaux et al. | 285/382 X |
| 5,088,771 | 2/1992 | Hosseinian et al. | 285/921 X |
| 5,452,921 | 9/1995 | Hyatt et al. | 285/382.2 X |

FOREIGN PATENT DOCUMENTS

| | | |
|---|---|---|
| 44-997 | 1/1969 | Japan . |
| 3-66550 | 10/1991 | Japan . |
| 6-109181 | 4/1994 | Japan . |
| 6-30597 | 4/1994 | Japan . |

*Primary Examiner*—Dave W. Arola
*Attorney, Agent, or Firm*—Cowan, Liebowitz & Latman, P.C.

[57] ABSTRACT

A coupling in which work for fixing an inner pipe is facilitated, and in which airtightness is maintained such that oil leaks do not occur. A fixing member is fixed to a through-hole formed in an interior portion of an outer pipe. The inner pipe is supported by the fixing member. When a press-fit portion of the fixing member is press-fit into the through-hole, due to a taper surface, an axial center of the inner pipe is aligned with a center of the through-hole, and the press-fit portion fits tightly to an inner peripheral wall of the through-hole while plastically deforming the inner peripheral wall. A portion of the inner peripheral wall of the through-hole, which portion is plastically deformed by the press-fit portion, enters into an annular groove. A seat surface portion abuts and fits tightly to a surface at a peripheral edge of the through-hole. Due to the fixing member, the through-hole is in a completely airtight state.

3 Claims, 5 Drawing Sheets

COUPLING HARDWARE

BACKGROUND OF THE INVENTION

1. Field of the Invention

The present invention relates to a coupling hardware device or simply a coupling, for connecting hydraulic hose or the like.

2. Description of the Related Art

As illustrated in FIG. 6, a coupling 64, which connects a brake pipe 60 and a rubber hose 62 of a brake device of an automobile, is formed by an outer pipe 66 and an inner pipe 68. The outer pipe 66 is cylindrical with a flange 70 formed at the outer periphery of an intermediate portion thereof. A rubber hose crimping portion 72 is formed at one side of the flange 70, and a screw connecting portion 74 is formed at the other side of the flange 70.

The rubber hose crimping portion 72 is a thin-walled cylinder. After an end portion of the rubber hose 62 is inserted into the rubber hose crimping portion 72, the rubber hose 62 and the rubber hose crimping portion 72 are connected by caulking. Further, a screw groove is formed in the inner wall of the screw connecting portion 74, and a flare nut 78 is screwed therewith. The rubber hose crimping portion 72 and the screw connecting portion 74 are separated by a separating wall 80, and communicate through a through-hole 82 formed in the central portion of the separating wall 80.

The inner pipe 68 is inserted into and fixed to the through-hole 82. The inner pipe 68 is a steel pipe at one end of which a truncated cone shaped seat portion 84 is formed. The brake pipe 60 has a flare portion 86 formed by gradually increasing the diameter of an end of the brake pipe 60 which, is fixed to the seat portion 84 in a pressure-contact state, so that a flared-type pipe joint is formed.

In the conventional coupling 64, the inner pipe 68 is inserted from the screw connecting portion 74 side and is fixed by copper brazing in a state in which the seat portion 84 projects from the through-hole 82.

However, in order to prevent oil leaks, the copper brazing must be carried out accurately with the axial center of the inner pipe 68 being aligned with the center of the through-hole 82, and dexterity and much work are required. Further, copper brazing leads to an increase in costs, and the hardness of the inner pipe 68 and the flange 70 deteriorates due to the effect of the heat of the copper brazing.

SUMMARY OF THE INVENTION

In view of the aforementioned, an object of the present invention is to provide a coupling which fixing facilitates fixing of the inner pipe, and in which airtightness is maintained so that oil leaks do no not occur.

In order to achieve the above object, the present invention provides a coupling for communicating pipe bodies. The coupling comprises an outer pipe to respective ends of which are connected, via an inner pipe which is inserted into and fixed to, a through-hole formed in an interior portion of the outer pipe. The inner pipe includes a fixing member provided at one end portion of the inner pipe which fixes the inner pipe to the through-hole, and the fixing member comprises: a seat surface portion larger than a diameter of the through-hole and abutting a surface at a peripheral edge of the through-hole; a press-fit portion inserted in the through-hole and having a taper surface whose diameter decreases from the seat surface portion in a direction of insertion of the, i.e., unidirectionally; and an annular groove into which enters a portion of an inner peripheral wall of the through-hole which is plastically deformed by the press-fit portion.

In the coupling of the present invention, the fixing member is fixed to the through-hole formed in the interior portion of the outer pipe, and the inner pipe is supported by the fixing member.

When the press-fit portion of the fixing member is press-fit into the through-hole, due to the taper surface, the axial center of the inner pipe is aligned with the center of the through-hole, and the press-fit portion fits tightly to an inner peripheral wall of the through-hole while plastically deforming the inner peripheral wall. Here, a portion of the inner peripheral wall of the through-hole, which portion is plastically deformed by the press-fit portion, enters into the annular groove. The seat surface portion abuts and fits tightly to the surface at the peripheral edge of the through-hole. Due to the fixing member, the through-hole is in a completely airtight state.

The above and other objects, features and advantages of the present invention will become apparent from the following description and the appended claims taken in conjunction with the accompanying drawings in which preferred embodiments of the present invention are shown by way of illustrative example.

BRIEF DESCRIPTION OF THE DRAWINGS

The invention will now be described with reference to the accompanying drawings wherein.

DESCRIPTION OF THE PREFERRED EMBODIMENTS

Figure 1:
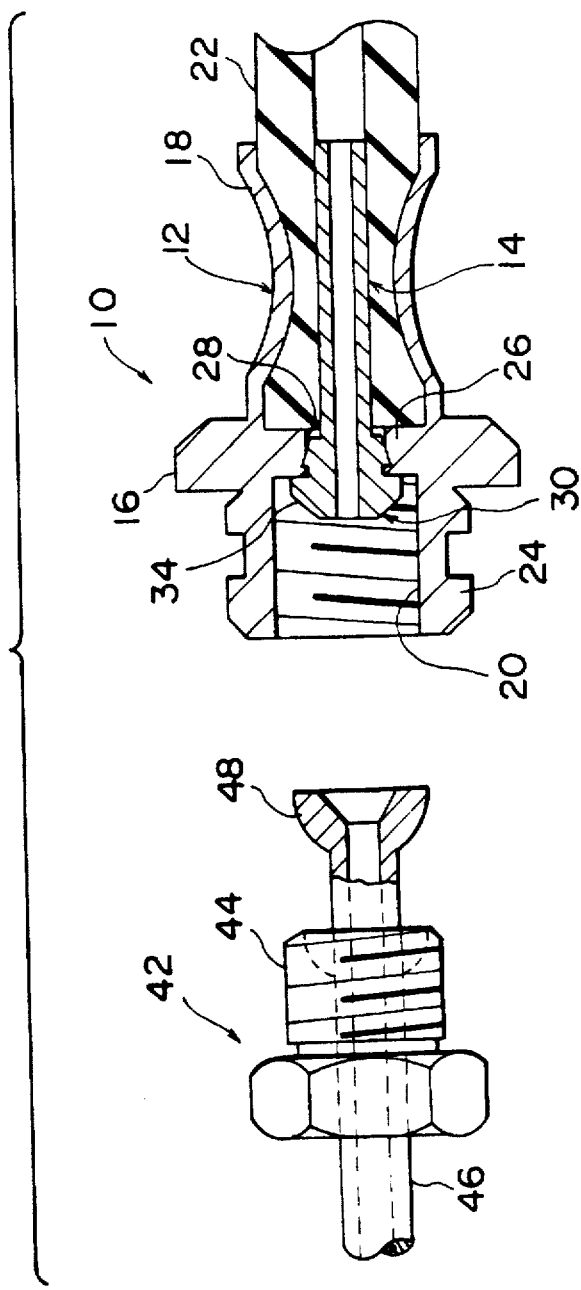
FIG. 1 is a sectional view of a coupling relating to a first embodiment of the present invention.

As illustrated in FIG. 1, a coupling 10 relating to the first preferred embodiment is formed by an outer pipe 12 and an inner pipe 14. The outer pipe 12 is cylindrical with a flange 16 formed on the outer periphery of an intermediate portion thereof. A rubber hose crimping portion 18 is formed at one side of the flange 16, and a screw connecting portion 20 is formed at the other side of the flange 16.

The rubber hose crimping portion 18 is a thin-walled cylinder. After an end portion of a rubber hose 22 serving as a brake hose is inserted into the rubber hose crimping portion 18, the rubber hose 22 and the rubber hose crimping portion 18 are connected by caulking. A nut portion 24 is formed on the outer peripheral portion of the screw connecting portion 20, and functions as a spanner detent.

The rubber hose crimping portion 18 and the screw connecting portion 20 are separated by a separating wall 26, and communicate via a through-hole 28 formed in a central portion of the separating wall 26.

The pipe-shaped inner pipe 14 is inserted in and fixed to the through-hole 28. One end of the inner pipe 14 extends within the rubber hose crimping portion 18. The other end of the inner pipe 14 projects within the screw connecting portion 20. A fixing member 30 is formed at the outer periphery of this other end of the inner pipe 14. The gap between the inner pipe 14 and the through-hole 28 is completely closed by the fixing member 30.

Figure 2:
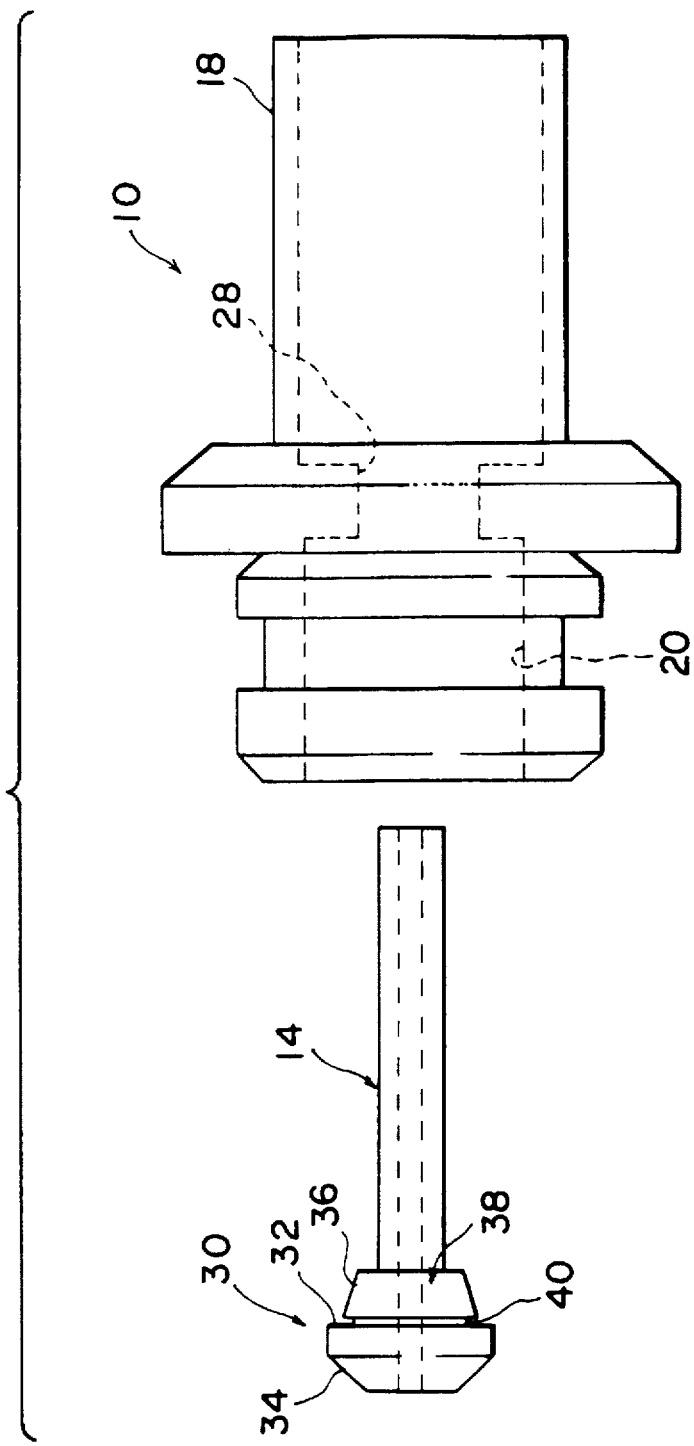
FIG. 2 is a side view illustrating a connection relation between an inner pipe and an outer pipe of the coupling to the first embodiment.

As illustrated in FIG. 2, the fixing member 30 has a seat surface portion 32, a seat portion 34 and a press-fit portion 38. The seat surface portion 32 is cylindrical and abuts the surface at the peripheral edge of the through-hole 28. The seat portion 34 is truncated cone shaped, and the diameter thereof decreases from the seat surface portion 82 in the direction of pulling out the inner pipe 14. The press-fit portion 38 has a taper surface 36 and fits into the through-hole 28. The taper surface 36 is truncated cone shaped. The diameter thereof is smaller than that of the seat surface portion 32 and decreases toward the rubber hose crimping portion 18 side. The length of the press-fit portion 38 is approximately equal to the length of the through-hole 28. The outer diameter of the intermediate portion of the press-fit portion 38 is approximately equal to the inner diameter of the through-hole 28. An annular groove 40, which is cut down a step, is formed between the press-fit portion 38 and the seat surface portion 32.

As illustrated in FIG. 1, a screw groove is formed in the inner wall of the screw connecting portion 20, and a screw portion 44 of a flare nut 42 is screwed therewith. A brake pipe 46 is inserted through the flare nut 42. A flare portion 48 whose diameter increases in a fan-like shape is formed at the end of the brake pipe 46. Accordingly, by fastening the flare nut 42 to the screw connecting portion 20, the flare portion 48 and the seat portion 34 are press-fitted, and the brake pipe 46 and the rubber hose 22 are connected via the inner pipe 14.

The processes for fixing the inner pipe 14 to the through-hole 28 of the outer pipe 12 will be described hereinafter.

Figure 3:
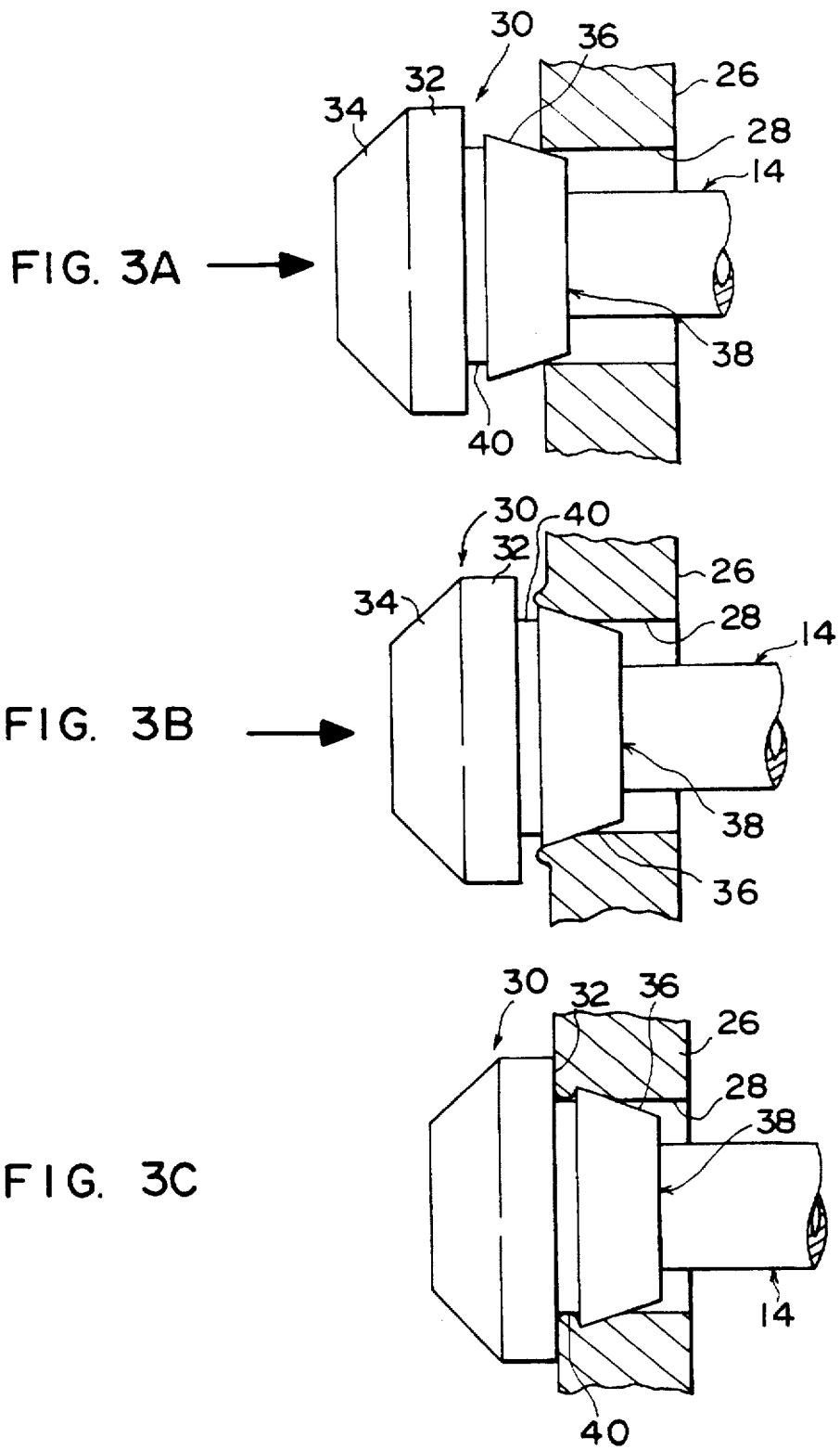
FIG. 3A is a partial sectional view illustrating a state in which a fixing member is inserted into a through-hole of the outer pipe.
FIG. 3B is a partial sectional view illustrating a state in which an inner peripheral wall of the through-hole plastically deforms.
FIG. 3C is a partial sectional view illustrating a state in which the fixing member is completely inserted into and fixed to the through-hole.

As shown in FIG. 3A, when the inner pipe 14 is inserted through the through-hole 28 from the screw connecting portion 20, the taper surface 36 of the press-fit portion 38 abuts the edge of the through-hole 28. Here, as illustrated in FIG. 3B, when the inner pipe 14 is pushed further in, the taper surface 36 of the press-fit portion 38 plastically deforms the edge portion of the through-hole 28. While the axial center of the inner pipe 14 is aligned with the center of the through-hole 28, the press-fit portion 38 is fit tightly to the inner peripheral wall of the through-hole 28. Moreover, as shown in FIG. 3C, when the inner pipe 14 is pushed even further in, the seat surface portion 32 abuts the surface at the peripheral edge of the through-hole 28, and the edge portion of the through-hole 28 which has been plastically deformed enters into the annular groove 40 such that the fixing member 30 is completely fit tightly to the through-hole 28 without the seat surface portion 32 having to be forced to enter the inner peripheral wall of the through-hole 28. The airtightness resulting from this tight fit is maintained both by the portion of the inner peripheral wall of the through-hole 28 which portion has plastically deformed and entered into the annular groove 40, and by the inner peripheral wall of the through-hole 28 and the taper surface 36 of the press-fit portion 38.

In this way, in the coupling hardware 10 of the first preferred embodiment, by merely press-fitting the inner pipe 14 into the through-hole 28, the work for mounting the inner pipe 14 is completed, and the airtightness is maintained so that oil leaks do not occur.

In the above description, the seat surface portion 32 is planar (i.e., has a slope of 0 degrees). However, the seat surface portion 32 may have a slope such that the center thereof protrudes toward the rubber hose crimping portion 18 side. The slope may be any arbitrary slope up to about 30 degrees.

Further, in the first preferred embodiment, not only is the airtightness maintained so that oil leaks do not occur, but also, the strength against the pulling out of the inner pipe 14 from the outer pipe 12 is greatly improved.

An experiment in which the press-fit portion 38 was press-fit into the through-hole 28 was conducted in a case in which the length of the press-fit portion 38 was 3 mm, the slope of the seat surface portion 32 was 10 degrees, and the outer pipe 12 was unannealed. The results of this experiment were that the press-fit load was 779.6 kgf, and the pull-out load was 681.6 kgf. When the same experiment was conducted using a conventional coupling, the press-fit load was 332.4 kgf, and the pull-out load was 288.8 kgf. Therefore, the strength against pull-out of the present embodiment is 2.4 times greater than that of the conventional coupling; any concerns of the inner pipe 14 being pulled out during insertion of the hose have disappeared completely.

Next, couplings relating to second and third preferred embodiments will be described.

Figure 4:
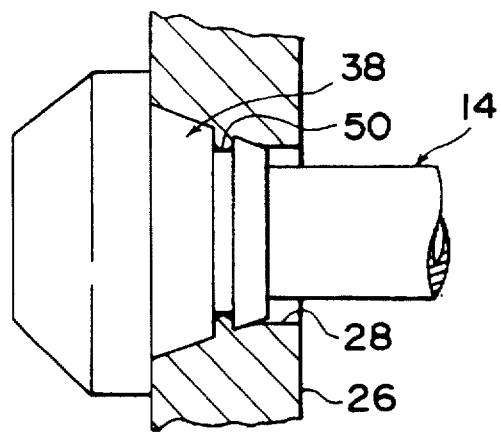
FIG. 4 is a partial sectional view illustrating a state in which a fixing member of a coupling relating to a second embodiment of the present invention is completely inserted into and fixed to a through-hole.
Figure 5:
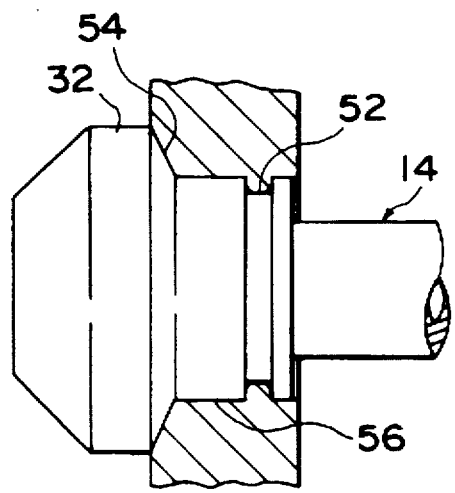
FIG. 5 is a partial sectional view illustrating a state in which a fixing member of a coupling relating to a third embodiment of the present invention is completely inserted into and fixed to a through-hole.
Figure 6:
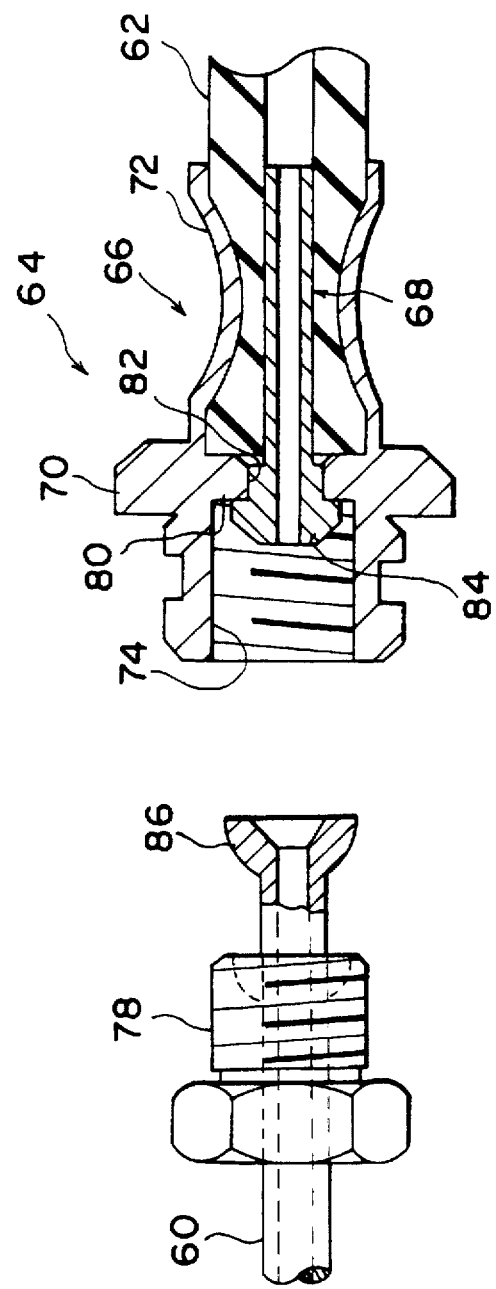
FIG. 6 is a sectional view of a conventional coupling.

As illustrated in FIG. 4, in the second preferred embodiment, an annular groove 50 is formed in the tip end side of the press-fit portion 88. The plastically deformed inner peripheral wall of the through-hole 28 enters into the annular groove 50. Further, in the third preferred embodiment illustrated in FIG. 5, a press-fit portion 56 is cylindrical, and a taper surface 54 is formed at the connecting portion of the press-fit portion 56 and the seat surface portion 32. An annular groove 52 is formed in the press-fit portion 56, and the plastically deformed inner peripheral wall of the through-hole 28 enters into the annular groove 52.

Various variations of the coupling relating to the present invention can be envisaged. The coupling hardware is not limited to the above-described embodiments; it suffices that, at least, the inner peripheral wall of the through-hole plastically deforms and the plastically deformed portion enters into the annular groove.

As the present invention has the above-described structure, work for fixing the inner pipe is facilitated, and airtightness is maintained so that oil leaks do not occur.

What is claimed is:

1. A coupling comprising an outer pipe and an inner pipe for communicating a pipe body connected to an end of said outer pipe with another pipe body, said outer pipe having a through-hole formed in an interior portion thereof, said through-hole being surrounded by an abutment surface;

said inner pipe including a fixing member provided at one end portion of said inner pipe by which said inner pipe is fixed to said through-hole of said outer pipe by insertion of said inner pipe into said outer pipe, and wherein said fixing member comprises:
- a seat surface portion larger than a diameter of said through-hole and abutting said abutment surface at a peripheral edge of said through-hole;
- a press-fit portion inserted in said through-hole and having a unidirectionally tapered surface whose maximum diameter is larger than the diameter of said through-hole and decreases from said seat surface portion in a direction of insertion of said press-fit portion; and
- an annular groove which is formed between said press-fit portion and said seat surface portion;

said inner peripheral wall of said through-hole being plastically deformed by said press-fit portion upon insertion of said inner pipe into said through-hole up to said seat surface portion and entering substantially into said groove without said seat surface being forced to enter into said abutment surface.

2. A coupling according to claim 1, wherein a length of said press-fit portion is approximately equal to a length of said through-hole.

3. A coupling according to claim 1, wherein an outer diameter of an intermediate portion of said press-fit portion is approximately equal to an inner diameter of said through-hole.

* * * * *